US008271717B2

(12) United States Patent
Kurashige

(10) Patent No.: US 8,271,717 B2
(45) Date of Patent: Sep. 18, 2012

(54) COMPUTING MACHINE WITH VIRTUAL MACHINE MONITOR

(75) Inventor: Takehiko Kurashige, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/101,763

(22) Filed: May 5, 2011

(65) Prior Publication Data

US 2012/0084510 A1    Apr. 5, 2012

(30) Foreign Application Priority Data

Sep. 30, 2010 (JP) .................................. 2010-221592

(51) Int. Cl.
*G06F 12/08* (2006.01)
(52) U.S. Cl. ..................... 711/6; 711/119; 711/E12.017
(58) Field of Classification Search .................. None
See application file for complete search history.

(56) References Cited

U.S. PATENT DOCUMENTS

| 7,107,404 | B2  |   | 9/2006  | Ohtsubo et al. |
|-----------|-----|---|---------|----------------|
| 7,673,128 | B2  | * | 3/2010  | Zimmer et al. ................... 713/2 |
| 8,078,827 | B2  | * | 12/2011 | Uhlig et al. ..................... 711/206 |
| 8,151,138 | B2  | * | 4/2012  | Khatri et al. .................. 714/6.23 |
| 2005/0278482 | A1 |   | 12/2005 | Ohtsubo et al. |
| 2006/0242399 | A1 | * | 10/2006 | Zimmer et al. ................... 713/2 |
| 2008/0270674 | A1 |   | 10/2008 | Ginzton ............................ 711/6 |
| 2009/0013149 | A1 | * | 1/2009  | Uhlig et al. ..................... 711/207 |
| 2010/0186010 | A1 | * | 7/2010  | Chalemin et al. ................ 718/1 |
| 2011/0022773 | A1 | * | 1/2011  | Rajamony et al. ............... 711/3 |
| 2011/0225343 | A1 |   | 9/2011  | Takeuchi |

FOREIGN PATENT DOCUMENTS

| JP | 04-225444 | 8/1992 |
| JP | 2001-184242 | 7/2001 |
| JP | 2005-352711 | 12/2005 |
| JP | 2007-272812 | 10/2007 |
| WO | 2010-055937 | 5/2010 |

OTHER PUBLICATIONS

Japanese Patent Application No. 2010-221592; Notice of Reasons for Rejection; Mailed Jul. 26, 2011 (English translation).
Noriyuki Shimizu, "Frontline of Virtualization Software: How to Increase the Speed of Windows vol. 24 Version Machine, with Mac at No Cost," Mac Fan, Mainichi Communications Corporation, Aug. 1, 2009, Japan, vol. 17, No. 8, pp. 142-143.
Suguru Yasui, "Linux Kernel for Beginners: 10th File System (Part II)," Nikkei Linux, Nikkei BP Corporation, Jun. 8, 2004, Japan, vol. 6, No. 6, pp. 125-133.
Hiroki Otsuka, "Method of Constructing Systems, Revolutionized with Virturization," (Part 8) Creating private cloud, there are four points for construction management Nikkei Computer, Nikkei BP Corporation, Sep. 15, 2010, Japan, No. 765, pp. 104-107.

* cited by examiner

*Primary Examiner* — Kevin Verbrugge
(74) *Attorney, Agent, or Firm* — Blakely, Sokoloff, Taylor & Zafman LLP

(57) ABSTRACT

According to one embodiment, a computing machine includes a virtual machine operated on a virtual machine monitor, the computing machine includes a first memory device, and a second memory device. The virtual machine monitor is configured to assign a part of a region of the first memory device as a third memory device to the virtual machine and to assign a part of a region of the second memory device as a fourth memory device to the virtual machine. The virtual machine comprises a first cache control module configured to use the fourth memory device as a read cache of the third memory device.

7 Claims, 2 Drawing Sheets

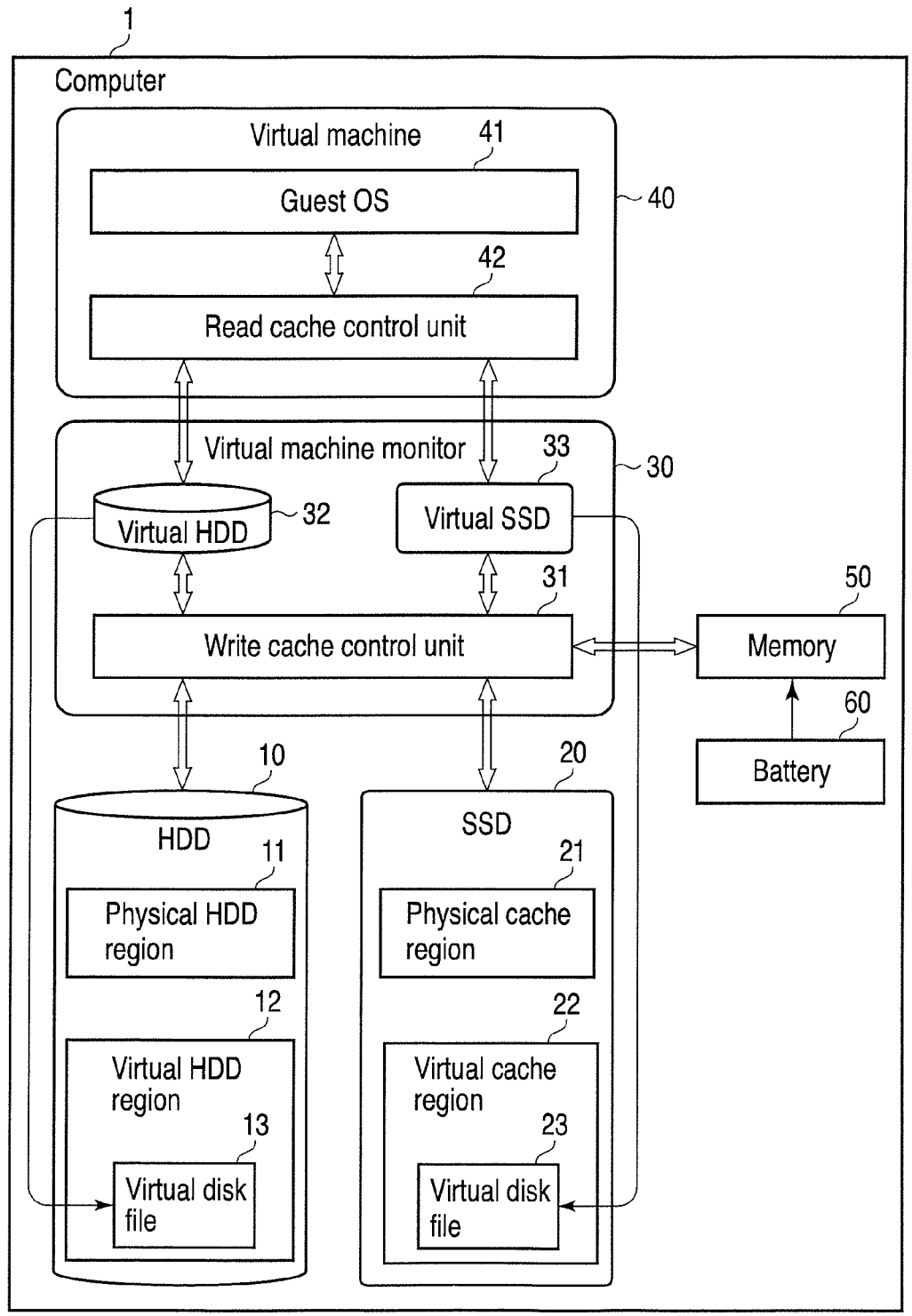
F I G. 1

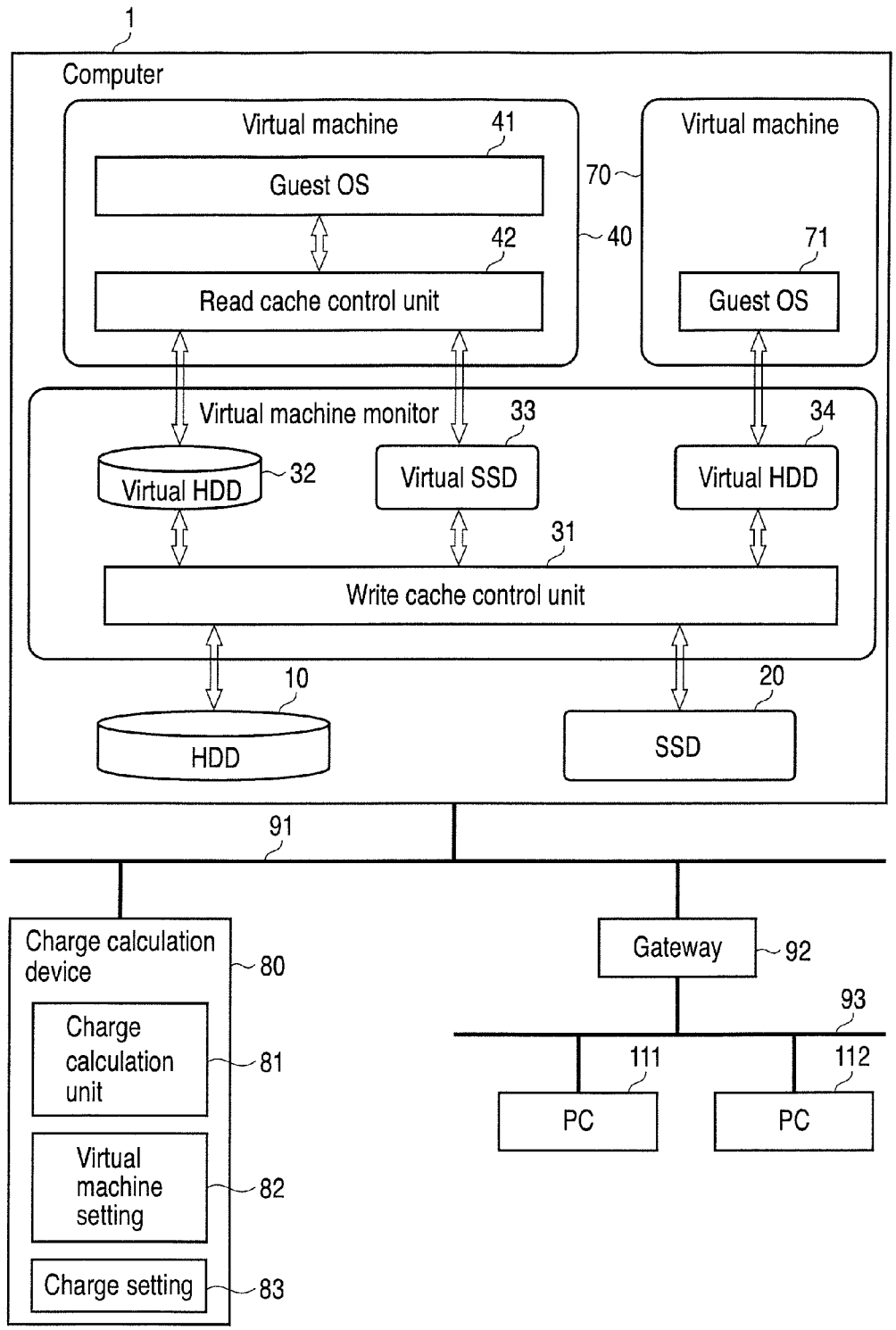
F I G. 2

COMPUTING MACHINE WITH VIRTUAL MACHINE MONITOR

CROSS-REFERENCE TO RELATED APPLICATIONS

This application is based upon and claims the benefit of priority from Japanese Patent Application No. 2010-221592, filed Sep. 30, 2010; the entire contents of which are incorporated herein by reference.

FIELD

Embodiments described herein relate generally to a computer having a cache mechanism and a computing system.

BACKGROUND

A virtual operating technique that makes it possible to operate a plurality of virtual machines each having a guest OS on a virtual machine monitor operated in one computer starts to be used. The virtual machine monitor assigns a computing resource including a hard disk drive and the like to a virtual machine.

If a cache control unit is provided on the virtual machine monitor, a cache is often filled with data accessed from a virtual machine whose access frequency is high in a least recently used (LRU) algorithm in which a cache that is not accessed for the longest time is discarded. Therefore, it is difficult to enjoy the effect of the cache in a virtual machine whose access frequency is low.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary diagram showing one example of the configuration of a computer according to a first embodiment.

FIG. 2 is an exemplary diagram showing one example of the configuration of a computing system according to a second embodiment.

DETAILED DESCRIPTION

Various embodiments will be described hereinafter with reference to the accompanying drawings.

In general, according to one embodiment, a computing machine comprising a virtual machine operated on a virtual machine monitor, the computing machine includes a first memory device, and a second memory device. The virtual machine monitor is configured to assign a part of a region of the first memory device as a third memory device to the virtual machine and to assign a part of a region of the second memory device as a fourth memory device to the virtual machine. The virtual machine comprises a first cache control module configured to use the fourth memory device as a read cache of the third memory device.

FIG. 1 is a diagram showing the configuration of a computer according to a first embodiment. The computer 1 is realized as a computer.

The computer 1 includes a hard disk drive (HDD) 10, solid state drive (SSD) 20, memory 50 and battery 60.

In the computer 1, a virtual machine monitor 30 is operated. A write cache control unit 31 is operated in the virtual machine monitor 30.

A plurality of virtual machines can be operated on the virtual machine monitor 30. In this embodiment, for example, a virtual machine 40 is operated on the virtual machine monitor 30. A guest OS 41 is operated in the virtual machine monitor 30. A read cache control unit 42 is operated on the guest OS 41.

The write cache control unit 31 operated in the virtual machine monitor 30 is a cache control mechanism exclusively used for a write cache. Further, the read cache control unit 42 operated in the virtual machine 40 is a cache control mechanism exclusively used for a read cache.

Instead of the HDD 10, a virtual HDD using a virtual HDD file can be used or an HDD connected via an interface such as a network or USB may be used. The SSD 20 is a cache device of the HDD 10 that is a non-cache device. Since the SSD 20 includes a flash memory, the number of rewrite operations thereof is limited In the SSD 20, a virtual cache region 22 in which cache data in response to read access from the virtual machine 40 that will be described later is stored and a physical cache region 21 in which cache data in response to write access from a host OS that will be described later is stored are set.

The write cache control unit 31 is cache control means exclusively used for a write cache that uses the physical cache region 21 of the SSD 20 as a write-back cache of the HDD 10. That is, the write cache control unit 31 fully utilizes the physical cache region 21 of the SSD in response to a write request from the virtual machine monitor 30 to the HDD 10 to enhance the write performance. However, even if the control unit fails to perform the caching operation in response to a read request from the virtual machine monitor 30 to the HDD 10, the control unit 31 does not cache data that is read-requested.

The write cache control unit 31 stores data such as a cache directory or bit map in the memory 50. The memory 50 is a memory different from a main memory in which an operating system or the like is executed. The memory is configured by a volatile memory such as a DDR2 SDRAM (Double-Data-Rate2 Synchronous Dynamic Random Access Memory). At the shutdown time, the write cache control unit 31 performs a process of writing data of the memory in the SSD 20. Further, at the next start time, the write cache control unit 31 performs a process of writing data that has been written in the SSD 20 back to the memory 50.

Even when an obstacle of hung-up, crash, unintentional power-off occurs, the storage content of the memory 50 is maintained by means of the battery 60. Then, after recovery, the write cache control unit 31 refers to data in the memory 50 to perform a restoring process of writing cache data that is not written in the HDD 10 of the SSD 20 to the HDD 10.

In the case of a RAID (Redundant Array of Inexpensive Disks) system, a memory is provided in a RAID card whose storage content is protected by means of a battery in order to make preparation for an obstacle of hung-up, crash, unintentional power-off or the like. The write cache control unit may store management information described above in the memory provided in the RAID system.

A virtual HDD 32 and virtual SSD 33 are assigned to the virtual machine 40 by the virtual machine monitor 30. The virtual SSD 33 is a cache device of the virtual HDD 32 that is a non-cache device. The substance of the virtual HDD 32 is a file such as a virtual disk file 13 arranged in the virtual HDD region 12 assigned to the region of the HDD 10. Further the substance of the SSD 33 is a virtual disk file 23 arranged in the virtual cache region 22 assigned to a part of the SSD 20. That is, the virtual machine monitor 30 processes read•write requests from the virtual machine 40 to the virtual HDD 32 and virtual SSD 33 as read•write requests to the HDD 10 and SSD 20.

When a plurality of virtual machines are operated on the virtual machine monitor 30, exclusive-use virtual SSDs are assigned to the respective virtual machines.

The read cache control unit 42 is cache control means exclusively used for reading and utilizing the virtual SSD 33 as a read cache of the virtual HDD 32. That is, a read request from the guest OS 41 to the virtual HDD 32 fully utilizes the virtual SSD 33 to enhance the read performance, but data that is write-requested from the guest OS 41 to the virtual HDD 32 is directly written in the virtual HDD 32. The read cache control unit 42 utilizes a least recently used (LRU) algorithm in which a cache that is not accessed for the longest time is discarded.

According to the computer 1, the read performance for a read request from the guest OS 41 is enhanced by means of the read cache control unit 42 and the write performance for a write request of the guest OS 41 is enhanced by means of the write cache control unit 31.

Next, a case is considered wherein the virtual machine 40 does not include the read cache control unit 42 and the virtual machine monitor 30 performs the read cache operation and includes a cache control unit using an LRU algorithm in which a cache that is not accessed for the longest time is discarded. If read access is made from a plurality of virtual machines, a cache that is not accessed for the longest time is discarded since the LRU algorithm is used. Therefore, if a virtual machine whose access frequency is low is present, there occurs a possibility that the cache of the above virtual machine is discarded.

However, in the case of the computer 1, the virtual SSD 33 that is assigned to the virtual machine 40 is a cache exclusively used for the virtual machine 40 and the read cache control unit 42 in the virtual machine 40 caches the assigned virtual SSD 33. The read cache control unit operated in another virtual machine caches an exclusive-use virtual SSD and does not cache the virtual SSD 33 exclusively used for the virtual machine 40. Therefore, even if the access frequency of read requests of the guest OS 41 is low in comparison with that of the guest OS operated on the other virtual machine, cache data will not be discarded. As a result, even if the access frequency of the virtual machine 40 is low, it is possible to enjoy the effect of the cache.

Further, since the read cache control unit 42 in the virtual machine 40 is a cache exclusively used for reading and the write cache control unit 31 in the virtual machine monitor 30 is a cache exclusively used for writing, the write cache control unit 31 does not cache the physical cache region 21 in response to a read request even when the read request is issued from the read cache control unit 42 in the virtual machine 40. Therefore, since the cache is not doubly written in the SSD, the service life of the SSD 20 can be suppressed from being reduced.

Further, when hung-up or crash occurs, unwritten data to the virtual HDD is not present in the virtual SSD since the restoration process is performed by means of the write cache control unit 31. Therefore, the computer 1 has the same reliability as that obtained when no cache control mechanism is provided.

Even when hung-up, crash, unintentional power-off of a real machine occurs, unwritten data to the HDD 10 can be restored to enhance the reliability since the write cache control unit 31 has a restoration function of performing a restoration process based on data stored in the memory 50 whose storage content is maintained by means of the battery.

A case wherein the write cache control unit 31 is cache control means exclusively used for the write cache is explained but, for example, a read cache operation can be performed according to a region of the HDD 10. For example, when a read request to the physical HDD region 11 of the HDD 10 is issued, the write cache control unit 31 fully utilizes the physical cache region 21 to enhance the read performance. However, even if the control unit fails to perform the cache operation in response to a read request to the virtual HDD region 12, the control unit does not cache data that is read-requested. In the above embodiment, the read performance is not enhanced in response to a read request from the virtual machine monitor 30 to the physical HDD region 11 of the HDD 10, but the read performance is enhanced in response to a read request from the virtual machine monitor 30 to the physical HDD region 11.

(Second Embodiment)

The virtual machine of the computer 1 can be provided as a rental server to a contract user. When the virtual machine is provided as a rental server, a service charge may be changed according to whether the virtual machine is assigned to the virtual SSD.

The configuration of a computing system in which a virtual machine according to a second embodiment of this invention is rented to a computer on Internet is explained with reference to FIG. 2.

The computer 1 is connected to Internet 93 via a network 91 and network gateway 90. Further, a charge calculation device 80 is connected to the network 91. The charge calculation device 80 is realized as a computer. Further, the charge calculation device 80 may be realized by a virtual machine operated on a virtual machine monitor 30.

A virtual machine 40 and virtual machine 70 are operated on the virtual machine monitor 30 of the computer 1. A virtual HDD 32 and virtual SSD 33 are assigned to the virtual machine 40 by means of the virtual machine monitor 30. In the virtual machine 40, a guest OS 41 and read cache control unit 42 are operated. A virtual HDD 34 is assigned to the virtual machine 70 by means of the virtual machine monitor 30. In the virtual machine 70, a guest OS 71 is operated.

The virtual machine 40 is rented to the user who utilizes, for example, a personal computer (PC) 111 connected to Internet 93. The virtual machine 70 is rented to the user who utilizes, for example, a personal computer (PC) 112 connected to Internet 93.

The service charges of the virtual machine 40 and virtual machine 70 are calculated by means of the charge calculation device 80.

The charge calculation device 80 includes a charge calculation unit 81. The charge calculation unit 81 calculates a service charge by referring to a virtual machine setting table 82 in which settings of the virtual machine monitor 30 and virtual machines 40, 70 are described and a charge setting table 83 in which charges corresponding to the settings are described. For example, the service charge of the virtual machine 40 to which the virtual SSD 33 is assigned and in which the read cache control unit 42 is operated is set lower than the service charge of the virtual machine 70 to which no virtual SSD is assigned.

Further, charges are set according to the capacities of the virtual SSDs assigned to the virtual machine for charge setting. The charge calculation unit 81 adds and calculates the service charges of the virtual machine 40 according to the capacities of the virtual SSDs 33 assigned to the virtual machine 40.

In FIG. 2, the memory 50 and battery 60 are not shown in the drawing, but the memory 50 and battery 60 may be provided to protect the storage content of the memory 50 when an obstacle occurs in the first embodiment and the restoration process may be performed by means of the write cache control unit 31.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A computing machine in which a virtual machine monitor is operated, the computing machine comprising:
   a first memory device; and
   a second memory device,
   wherein a virtual machine is operated on the virtual machine monitor,
   the virtual machine monitor is configured to assign a part of a region of the first memory device to the virtual machine as a third memory device,
   the virtual machine comprises a first cache control module configured to use a fourth memory device of a part of a region of the second memory device as a read cache of the third memory device, and
   the virtual machine monitor comprises a second cache control module configured to use a part of the region of the second memory device, which is not assigned to the virtual machine, as a cache of the region of the first memory device, which is not assigned to the virtual machine.

2. The computing machine of claim 1, further comprising:
   a memory; and
   a battery configured to protect storage content of the memory when an obstacle occurs in the computing machine,
   wherein the second cache control module is configured to store, in the memory, management information indicating data, which is written to the second memory device and which is not written to the first memory device, and to write, to the first memory device, data which is not written to the first memory device based on the management information after an obstacle occurs in the computing machine.

3. The computing machine of claim 1, wherein the second cache control module is configured to use a part of the region of the second memory device, which is not assigned to the virtual machine, as a write cache of the first memory device or as a read cache of the region of the second memory device, which is not assigned to the virtual machine.

4. A computing system comprising:
   a computing machine in which a first virtual machine and a second virtual machine are operated on a virtual machine monitor,
   wherein the computing machine comprises a first memory device and a second memory device that includes a flash memory,
   the virtual machine monitor is configured to assign a part of a region of the first memory device to the first virtual machine, as a third memory device and to assign a part of the region of the first memory device to the second virtual machine as a fourth memory device,
   the first virtual machine comprises a first cache control module configured to use a fifth memory device of a part of a region of the second memory device as a read cache of the third memory device, and
   the virtual machine monitor comprises a second cache control module configured to use a part of the region of the second memory device, which is not assigned to a virtual machine, as a cache of a region of the first memory device, which is not assigned to a virtual machine.

5. The computing system of claim 4, wherein the second cache control module is configured to use the part of the region of the second memory device, which is not assigned to a virtual machine, as a write cache of the first memory device or as a read cache of the region of the first memory device, which is not assigned to a virtual machine.

6. The computing system of claim 5, further comprising a charge calculation device configured to calculate a first service charge corresponding to a case where the first cache control module is present as a service charge of the first virtual machine and to calculate a second service charge corresponding to a case where the first cache control module is not present as a service charge of the second virtual machine.

7. The computing system of claim 6, wherein the charge calculation apparatus is configured to calculate a third service charge corresponding to capacity of the fourth memory device as a service charge of the first virtual machine.

* * * * *